Aug. 21, 1956  G. G. INGHAM  2,759,406
FILM RACK, SUPPORT AND DRIP TRAY
Filed Aug. 7, 1953  2 Sheets-Sheet 2
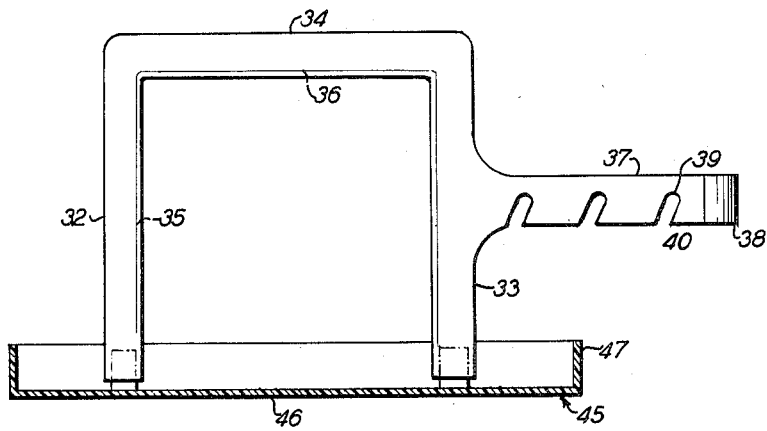
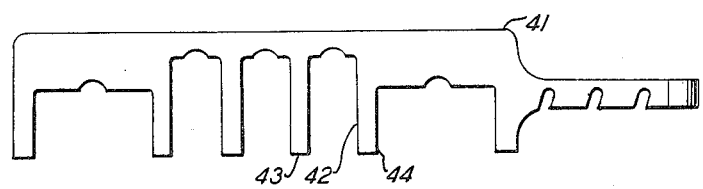
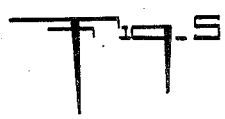
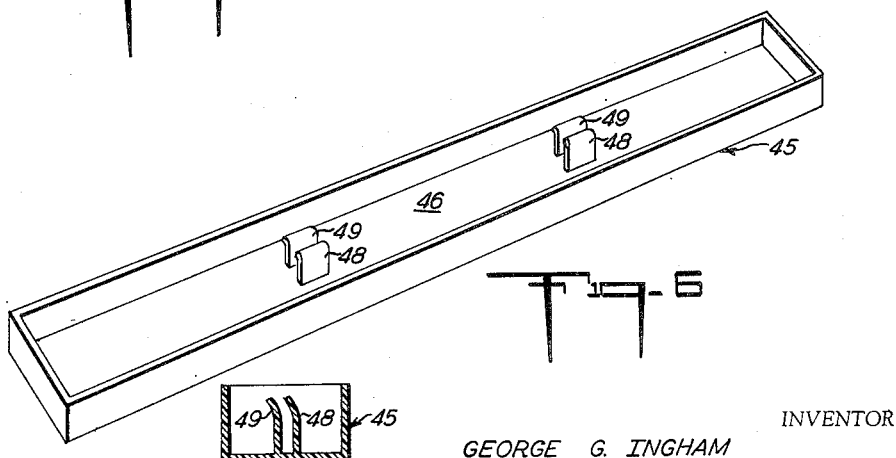
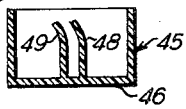
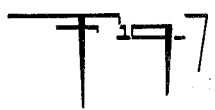
INVENTOR
GEORGE G. INGHAM
BY Jacobi & Jacobi
ATTORNEYS United States Patent Office 2,759,406
Patented Aug. 21, 1956

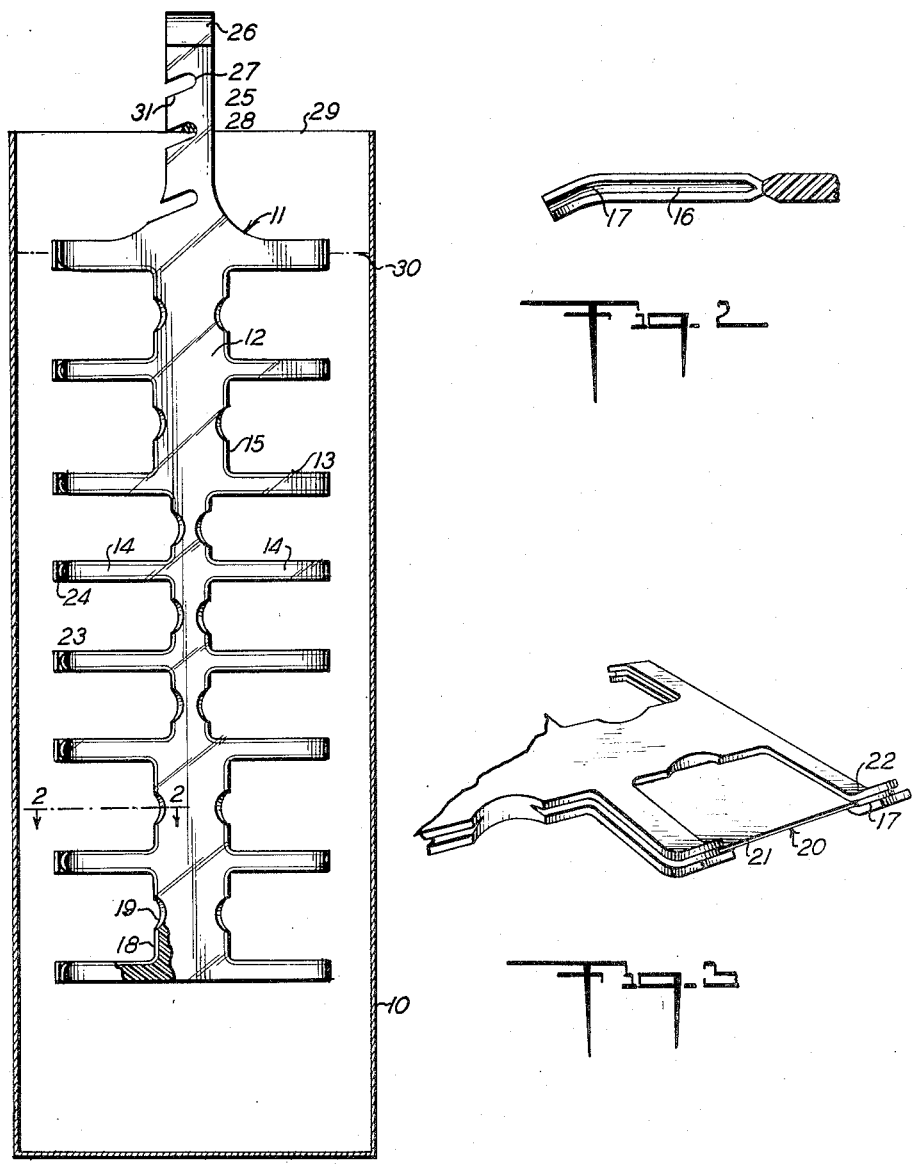

2,759,406

FILM RACK, SUPPORT AND DRIP TRAY

George G. Ingham, Amarillo, Tex.

Application August 7, 1953, Serial No. 373,002

16 Claims. (Cl. 95—100)

This invention relates to photography and more particularly to a rack or holder for receiving and supporting individual films during a developing or other treating process and for inspection thereof.

Heretofore many types of film holders have been developed and those most commonly employed at the present time consist of a central metallic member having arms extending from each side thereof and with spring clips at the outer ends of such arms for engaging and holding individual films. These clips are usually provided with serrations or other projections in order to firmly grip the film and these projections frequently cause holes in the film or otherwise damage the same.

Also, these prior art holders grip the film in such a manner that the films extend therefrom at varying angles and consequently when such holders are disposed in a developing or other treating tank there is frequent interference between films on adjacent holders, and very often films are detached from the holders by this interference and by reason of the fact that such detached films are very difficult to retrieve from the bottom of the tank, the same are frequently ruined due to over development or other causes.

These prior art holders in no way protect the films and as a consequence the same are frequently damaged to a sufficient extent to materially impair their usefulness if not to such an extent that the same are actually destroyed. Metal racks or holders must be formed of a material which is not affected by the various treating solutions and since this material is usually stainless steel such racks or holders are relatively expensive and also reatively heavy.

It is therefore an object of the invention to provide a one piece film holder for receiving and protecting a plurality of individual films during treatment or inspection thereof.

A further object of the invention is the provision of a one piece film holder for receiving and protecting individual films which engages only the edges of the film and in which means is provided for preventing displacement of the film without in any way disfiguring or damaging the same.

A still further object of the invention is the provision of a film holder constructed of plastic, wood, metal or any other suitable material in which individual recesses are provided for receiving films the walls of such recesses having grooves for engaging the edges of the films, certain of these grooves terminating in curved portions to prevent displacement of the films.

Another object of the invention is the provision of a film holder having recesses for receiving and supporting individual films and in which means is provided for facilitating insertion of the films into such recesses.

A further object of the invention is the provision of a film holder having recesses for receiving and supporting individual films and in which means is provided for facilitating removal of the film from such recesses without necessitating gripping of the film by the fingers which would tend to damage or disfigure the same.

A still further object of the invention is the provision of a film holder for receiving and supporting individual films during development or other treatment and in which means is provided for suspending the holder at different levels in a treating tank.

Another object of the invention is the provision of a combined film holder, support and drip tray in which the film holder is detachably secured to the drip tray in such a position that the films carried by the film holder may be conveniently inspected.

A further object of the invention is the provision of a combined film holder, support and drip tray in which the drop tray may be conveniently transported from place to place merely by grasping the film holder and in which the film holder may be conveniently and quickly detached from the drip tray.

Further objects and advantages of the invention will be apparent from the following description taken in conjunction with the accompanying drawings wherein:

Fig. 1 is a vertical sectional view through a treating tank and showing a film holder constructed in accordance with this invention suspended in the tank, the holder being shown in elevation and with a portion thereof broken away and shown in section for greater clarity;

Fig. 2, a fragmentary sectional view on the line 2—2 of Fig. 1;

Fig. 3, a fragmentary perspective view showing a portion of the film holder with a film disposed in one of the recesses;

Fig. 4, a sectional view showing a slightly modified form of the invention with the film holder being shown in elevation and disposed in a support and drip tray;

Fig. 5, an elevational view showing a further modified form of the invention;

Fig. 6, a perspective view showing the combined support and drip tray; and

Fig. 7, a detail sectional view showing the means for releasably attaching the film holder to the support and drip tray.

With continued reference to the drawings there is shown in Fig. 1 a developing or treating tank 10 which may be of any desired configuration or size and which is adapted to receive films carried in a film holder 11 for treatment thereof. Film holder 11 may be constructed of plastic, wood, metal or any other suitable material, however, it has been found that plastic is probably the least expensive and most practical and convenient material to use. The holder may be molded or may be machined from a solid sheet of material but in production undoubtedly the same will be molded.

While the film holder of Fig. 1 is shown as of a type for receiving and supporting dental X-ray films it is to be understood that this is for purpose of illustration only and that the holder may be made in any desired shape or size in order to accommodate all types and sizes of photographic or other films. Holder 11 may conveniently comprise an elongated body 12 having a plurality of film receiving recesses 13 formed by a plurality of arms 14 projecting from each side of the body 12 and forming the sides of the recesses. The body 12 forms the inner wall 15 of each recess and the outer ends of the recesses are open to permit convenient insertion of the films.

The arms 14 forming the sides of the recesses 13 are provided with opposed grooves 16 for receiving the edges of the film and as best shown in Figs. 2 and 3 grooves 16 terminate at their outer ends in a curved groove 17. The purpose and operation of the curved grooves 17 will be presently described. The inner wall 15 of each recess is also provided with a groove 18 communicating with the grooves 16 in the arms 14 forming the sides of the recesses and a curved recess 19 is provided in each inner wall 15 to permit convenient engagement of the finger with the edge of the film to eject the same from the holder without necessitating grasping the film in the fingers which might result in damage thereto. While the recess 19 is shown in the drawing as being curved, obviously this recess could be formed to any desired configuration.

As best shown in Fig. 3, a film 20 is disposed in a recess 13 with the edges of the film engaging in the grooves 16 and 18. It is to be noted that when the film 20 is fully inserted in the recess 13 that the outer edge 21 thereof is disposed inwardly of the point of juncture of the curved grooves 17 with the straight grooves 16. Thus in order to remove the film 20 from the recess 13 it is necessary that the same slide from the straight grooves 16 through the curved grooves 17 which results in a limited bending of the film. The resistance to such bending by the material of the film is sufficient to prevent inadvertent removal of the film from the recess 13 since an appreciable force must be applied in order to effect such removal. Furthermore, this means for retaining the film in the recess does not in any way disfigure or damage the film since there are no clamps or other gripping devices and also since the film is only engaged at the edges thereof.

In order to facilitate insertion of the films into the recesses a portion of one wall 22 of each curved groove 17 is removed to provide shoulders 23 and 24 as shown in Fig. 1 which shoulders may be engaged by the film and guide the same into the curved grooves 17.

It is to be noted that when the films 20 are disposed in the recesses 13 that the same are protected from all sides and that even were two film holders in contact with each other there would be no contact between the films which might result in damage thereto and furthermore there can be no danger of inadvertently displacing the films from the recesses. The films must be forceably displaced by engaging the edges thereof adjacent the inner walls 15 and even though the holder 11 may be violently shaken or agitated the films will still maintain their positions within the recesses. As a consequence, a substantially greater number of holders may be disposed in a treating tank of any given size than is possible with the present widely used type of holder in which the films project at varying angles therefrom necessitating a substantial space between adjacent holders in order to prevent damage to the films or detachment thereof from the holders.

In order to suspend the holder 11 in tank 10 and to compensate for changes in the level of treating liquid in the tank the holder 11 may be provided with an elongated neck 25 terminating in a hook 26 which may be utilized to suspend the same from any desired support. A plurality of spaced apertures 27 may be provided in the neck 25 and each of these apertures 27 may serve to selectively receive a rod 28 which may extend across the tank 10 and be supported on the upper edge 29 thereof. As shown in Fig. 1 the liquid level is indicated by a line 30 and in this instance the rod 28 is received in the central aperture 27. If the liquid level were above the line 30 the rod 28 would be received in the lower aperture 27 and if the liquid level were below the line 30 the rod 28 would be received in the upper aperture 27 or the holder 11 might be supported by the hook 26.

In order to permit disposition of the holder 11 on the rod 28 without removing such rod from other holders which may be disposed thereon slots 31 may be provided extending inwardly from one edge of the neck 25 and communicating with the apertures 27. These slots 31 may be disposed at a slight upward inclination toward the apertures 27 in order to prevent inadvertent removal of the holder 11 from the rod 28.

A modified form of the invention for accommodating a single film of somewhat larger dimensions than the films carried by the holder of Fig. 1 is shown in Fig. 4 and this may well comprise a body having arms 32 and 33 connected by a member 34. Arms 32 and 33 may be provided with opposed grooves 35 and the member 34 may be provided with a groove 36. The arms 32 and 33 terminate at their outer ends in curved portions and there are also provided curved grooves in these portions communicating with grooves 35 in the arms 32 and 33 thus serving to receive and hold a film in the same manner as the holder described above. An elongated neck 37 may extend from the arm 33 and this neck may terminate in a supporting hook 38. Spaced apertures 39 may be provided in the neck 37 and inclined slots 40 may be provided communicating with the apertures 39. This supporting arrangement is the same as that described above in connection with Fig. 1.

A still further modified form of the invention is shown in Fig. 5 in which a body 41 is provided with recesses 42 defined by arms 43 and 44 extending from only one side of the body 41. The structure of this holder is the same as that described above in connection with Fig. 1 there being opposed straight and curved grooves for receiving the film and the holder being supported in a treating tank in the same manner.

Since frequently it is desired to inspect films immediately upon removal of the same from a treating tank and while they are still wet a combined support and drip tray is provided which is shown in detail in Figs. 4, 6 and 7. This support and drip tray 45 may well comprise a bottom wall 46 and upstanding side and end walls 47 and the tray may be formed of plastic or any other suitable material. Disposed within the tray and extending upwardly from the bottom wall 46 is a pair of spaced fingers 48 and 49 which fingers may be formed integral with the bottom wall 46. These fingers 48 and 49 as shown in Fig. 7 are curved to receive the curved outer ends of the arms of the holder to be supported and the material of the fingers 48 and 49 is sufficiently resilient to firmly grasp the arms of the holder and retain the same in position. It is to be understood that at least two pairs of fingers 48 and 49 will be provided in order to engage and support the film holder at spaced points and this engagement is such that the film holder may be grasped by the neck 25 or 37 as the case may be and the holder and tray 45 carried from place to place for convenient inspection of the films carried thereby. The tray 45 will receive and collect all drippage from the films carried by the film holder and the tray 45 likewise provides a convenient base for supporting the holder on a desk or other supporting surface. If desired, of course, the fingers 48 and 49 may be formed separate from the tray 45 and attached thereto in any convenient manner such as by cement.

It will be seen that by the above described invention there has been provided a film holder of extremely lightweight construction and one which permits convenient insertion and removal of films and which at the same time provides complete protection for the film and positively prevents inadvertent removal of such films from the holder. The films are only engaged by the edges thereof and no clamps or equivalent means is provided or necessary and consequently the films are not perforated or otherwise damaged. Since the films are entirely within the confines of the holder there is no danger of contact of the films with adjacent holders or other films even though such adjacent holders may be in direct contact with each other. It will further be obvious that the holder of this invention may be conveniently and economically manufactured in mass production by a relatively simple molding operation although of course, if desired, the device may be manufactured by machining operations or a combination of molding and machining may be utilized.

It will be obvious to those skilled in the art that various changes may be made in the invention without departing from the spirit and scope thereof and therefore the invention is not limited by that which is shown in the drawings and described in the specification but only as indicated in the appended claims.

What is claimed is:

1. A one piece film holder comprising an elongated substantially flat body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a curved recess in said inner wall substantially centrally thereof for exposing a nedge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and terminating in a hook for suspending said body from a support, a plurality of apertures in said neck for selective disposition on a rod for supporting said holder at different elevations and inclined slots in said neck communicating with said apertures.

2. A film holder comprising an elongated substantially flat body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a curved recess in said inner wall substantially centrally thereof for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and terminating in a hook for suspending said body from a support and a plurality of apertures in said neck for selective disposition on a rod for supporting said holder at different elevations.

3. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a curved recess in said inner wall substantially centrally thereof for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and terminating in a hook for suspending said body from a support and a plurality of apertures in said neck for selective disposition on a rod for supporting said holder at different elevations.

4. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a recess in said inner wall for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and terminating in a hook for suspending said body from a support and a plurality of apertures in said neck for selective disposition on a rod for supporting said holder at different elevations.

5. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a recess in said inner wall for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and means for suspending said body from a support and a plurality of apertures in said neck for selective disposition on a rod for supporting said holder at different elevations.

6. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a groove in said inner wall for receiving an edge of said film, a recess in said inner wall for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and means for supporting said holder at different elevations.

7. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, a recess in said inner wall for exposing an edge of said film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and means for supporting said holder at different elevations.

8. A film holder comprising an elongated body, a plurality of generally rectangular recesses in each side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves, an elongated neck extending from one end of said body and means for supporting said holder at different elevations.

9. A film holder comprising an elongated body, a plurality of generally rectangular recesses in one side of said body for receiving individual films, each recess being defined by opposed arms extending outwardly from said body and an inner wall, said arms terminating at their outer ends in a curved portion, opposed grooves in said arms and opposed curved grooves in said curved portions for receiving the edges of a film, the depth of said rectangular recess being such that a film disposed in said grooves is located inwardly of the curved grooves in said arms whereby films are retained in said recesses, the walls on one side of said curved grooves at the outer ends thereof being removed to expose the opposite walls of said curved grooves to provide shoulders for guiding said films into said grooves and means for supporting said holder at different elevations.

10. A film holder comprising a body, a generally rectangular recess in said body for receiving a film, said recess being defined by opposed arms extending outwardly from said body and an inner wall, said arms terminating at their outer ends in a curved portion, opposed grooves in said arms and opposed curved grooves in said curved portions for receiving the edges of a film, the depth of said rectangular recess being such that a film disposed in said grooves is located inwardly of the curved grooves in said arms whereby said film is retained in said recess, the walls on one side of said curved grooves at the outer ends thereof being removed to expose the opposite walls of said curved grooves to provide shoulders for guiding said film into said grooves and means for supporting said holder.

11. A film holder comprising a body, a generally rectangular recess in said body for receiving a film, said recess being defined by opposed arms extending outwardly from said body and an inner wall, said arms terminating at their outer ends in a curved portion, opposed grooves in said arms and opposed curved grooves in said curved portions for receiving the edges of a film, the depth of said rectangular recess being such that a film disposed in said grooves is located inwardly of the curved grooves in said arms whereby said film is retained in said recess and means for supporting said holder.

12. In combination a film holder, support, and drip tray, said film holder comprising an elongated substantially flat body, a plurality of generally rectangular recesses in each side of said body for receiving individual films, each recess being defined by opposed arms extending outwardly from said body and an inner wall, said arms terminating at their outer ends in a curved portion, opposed grooves in said arms and in said curved portions to receive and hold said film, said support and drip tray being defined by upstanding side and end walls and a bottom wall, spaced pairs of resilient fingers formed integrally with said bottom wall and extending upwardly therefrom, said fingers being curved in accordance with the curvature of said curved portion whereby the curved portions of spaced arms may be releasably disposed between said pairs of fingers to support said holder above said drip tray and permit transportation of said drip tray by grasping said holder.

13. In combination a film holder, support, and drip tray, said film holder comprising an elongated substantially flat body, a plurality of generally rectangular recesses in each side of said body for receiving individual films, each recess being defined by opposed arms extending outwardly from said body and an inner wall, said arms terminating at their outer ends in a curved portion, opposed grooves in said arms and in said curved portions to receive and hold said films, said support and drip tray being defined by upstanding side and end walls and a bottom wall, spaced pairs of resilient fingers extending upwardly from said bottom wall said fingers being curved in accordance with the curvature of said curved portion whereby the curved portions of spaced arms may be releasably disposed between said pairs of fingers to support said holder above said drip tray and permit transportation of said drip tray by grasping said holder.

14. In combination a film holder, support, and drip tray, said film holder comprising a body, a plurality of generally rectangular recesses in each side of said body for receiving individual films, each recess being defined by opposed arms extending outwardly from said body and an inner wall, said arms terminating at their outer ends in a curved portion, opposed grooves in said arms and in said curved portions to receive and hold said films, said support and drip tray being defined by upstanding side and end walls and a bottom wall, spaced pairs of resilient fingers extending upwardly from said bottom wall said fingers being curved in accordance with the curvature of said curved portion whereby the curved portions of spaced arms may be releasably disposed between said pairs of fingers to support said holder above said drip tray and permit transportation of said drip tray by grasping said holder.

15. In combination a film holder, support, and drip tray, said film holder comprising a body, a plurality of generally rectangular recesses in each side of said body for receiving individual films, each recess being defined by opposed arms extending outwardly from said body and an inner wall, said arms terminating at their outer ends in a curved portion, opposed grooves in said arms and in said curved portions to receive and hold said films, said support and drip tray being defined by upstanding side and end walls and a bottom wall, spaced pairs of fingers extending upwardly from said bottom wall said fingers being curved in accordance with the curvature of said curved portion whereby the curved portions of spaced arms may be releasably disposed between said pairs of fingers to support said holder above said drip tray and permit transportation of said drip tray by grasping said holder.

16. In combination a film holder, support, and drip tray, said film holder comprising a body, a generally rectangular recess in said body for receiving a film, said recess being defined by opposed arms extending outwardly from said body and an inner wall, said arms terminating at their outer ends in a curved portion, opposed grooves in said arms and in said curved portions to receive and hold said films, said support and drip tray being defined by upstanding side and end walls and a bottom wall, spaced pairs of fingers extending upwardly from said bottom wall said fingers being curved in accordance with the curvature of said curved portion whereby the curved portions of said arms may be releasably disposed between said pairs of fingers to support said holder above said drip tray and permit transportation of said drip tray by grasping said holder.

References Cited in the file of this patent

UNITED STATES PATENTS

| | | |
|---|---|---|
| 1,629,285 | Mabee | May 17, 1927 |
| 1,792,005 | Elliott | Feb. 10, 1931 |
| 2,668,486 | Barker | Feb. 9, 1954 |